United States Patent [19]
Turi et al.

[11] Patent Number: 5,478,676
[45] Date of Patent: Dec. 26, 1995

[54] CURRENT COLLECTOR HAVING A CONDUCTIVE PRIMER LAYER

[75] Inventors: Eran Turi, Springfield; Marie B. Ray, Ware, both of Mass.

[73] Assignee: Rexam Graphics

[21] Appl. No.: 284,300

[22] Filed: Aug. 2, 1994

[51] Int. Cl.$^6$ ..................................................... H01M 4/72
[52] U.S. Cl. ........................................... 429/234; 204/279
[58] Field of Search .................................... 429/233, 191, 429/162, 122, 234, 212, 217; 204/279

[56] References Cited

U.S. PATENT DOCUMENTS

| | | | |
|---|---|---|---|
| 3,922,178 | 11/1975 | Winger | 136/133 |
| 3,957,533 | 5/1976 | Mead et al. | 136/83 R |
| 4,117,209 | 9/1978 | Markin et al. | 429/104 |
| 4,123,596 | 10/1978 | Robinson | 429/104 |
| 4,125,686 | 11/1978 | Kinsman | 429/152 |
| 4,160,069 | 7/1979 | Johnson et al. | 429/104 |
| 4,173,066 | 11/1979 | Kinsman | 29/623.1 |
| 4,210,708 | 7/1980 | Mead et al. | 429/181 |
| 4,225,665 | 9/1980 | Schadt, III | 430/529 |
| 4,307,162 | 12/1981 | Athearn | 429/121 |
| 4,434,215 | 2/1984 | Wszolek et al. | 429/144 |
| 4,492,021 | 1/1985 | Wright et al. | 29/623.1 |
| 4,545,926 | 10/1985 | Fouts, Jr. et al. | 252/511 |
| 4,602,984 | 7/1986 | Beaver et al. | 204/59 R |
| 4,605,602 | 8/1986 | Feigenbaum et al. | 429/26 |
| 4,701,403 | 10/1987 | Miller | 430/529 |
| 4,713,686 | 12/1987 | Brennan | 429/104 |
| 5,071,533 | 12/1991 | de Nora et al. | 204/243 R |
| 5,108,855 | 4/1992 | Daifuku et al. | 429/191 |

OTHER PUBLICATIONS

Safety of Carbon anodes for Lithium ion Cells, by Ulrich von Sacken, Eric Nodwell, Avtar Sundher and J. R. Dahn, Seventh International Meeting on Lithium Batteries, Boston, Mass., May 15–20, 1994.

Novel Forms of Carbon as potential Anodes for Lithium Batteries, by Randal E. Winans and K. A. Carrado, Seventh International Meetinf on Lithium Batteries, Boston, Mass., May 15–20, 1994.

Lithium Ion Batteries for electronic applications By Sid Megahed, Seventh International Meeting on Lithium Batteries, Boston, Mass., May 15–20, 1994.

Lithium Manganese Oxide Cathodes for rechargeable Lithium Batteries by Peter G. Bruce and Haitao Huang Seventh International Meeting on Lithium Batteries, Boston, Mass., May 15–20, 1994.

Batteries (Primary cells), Kirk–Othmer, pp. 515–521 vol. 3 Encyclopedia of Chemical Technology, 3rd Edition 1978.

*Primary Examiner*—Kathryn Gorgos
*Attorney, Agent, or Firm*—Breneman, Georges & Krikelis

[57] ABSTRACT

A current collector which uses a conductive primer layer under an electrode layer to improve the contact and adhesion of the electrode layer to a supporting member, wherein the conductive primer layer is composed of a polymeric material having pendant carboxylic acid groups crosslinked with a multifunctional crosslinking agent, and a conductive filler. The current collector may be used inter alia for making batteries.

32 Claims, 1 Drawing Sheet

CURRENT COLLECTOR HAVING A CONDUCTIVE PRIMER LAYER

BACKGROUND OF THE INVENTION

1. Field of the Invention

This invention relates to current collectors and more particularly to a multilayered structure for use as a current collector in a battery.

2. Description of Related Art

A typical battery structure includes two electrodes, serving as the anode and cathode, in contact with an electrolyte. Originally the anode and cathode served also as the conduit through which the electric current generated by the battery was guided to a point outside the battery for eventual use, and the anode and cathode served the dual function of electrode and current collector.

As battery technology became more sophisticated, the current collection function was in a number of applications done through a separate conductor which did not necessarily function as an electrode. The term "current collector" as used in this application is understood to mean the combination of the elements that function as anode or cathode, generically known as electrodes, together with the elements for collecting or distributing the current accumulated on the electrodes, be it a signal current or current generated in a battery.

When the current collector comprises a metal or metalized support in addition to the electrode material, it is important that the anode or cathode electrode material exhibit good contact and adhesion to the metal as such good contact and adhesion improve the overall efficiency and life of the battery. It is known to use a coating between the electrode material and the metal to enhance the contact and/or adhesion of the electrode material to the metal and to protect the metal from the often corrosive effects of the electrolyte and in certain cases of the anodic or cathodic material itself. Further more such protective coating at times serves to prevent the support metal from becoming part of the electrochemistry of the battery.

U.S. Pat. No. 4,173,066 issued to Kinsman discloses a current collector comprised of an aluminum foil coated with a thin layer of a conductive primer; two plies of a vinyl film are laminated over the primed side of the aluminum foil. Both the primer and the vinyl film are rendered conductive through the use of carbon black incorporated therein. The cathode and anode electrode materials are adhered to the vinyl film.

While this current collector works well in a LeClanche type cell, it dissolves in many organic solvents found in certain modern battery cells particularly Lithium based batteries which have electrolytes containing propylene carbonate or other ethers that swell and dissolve the vinyl film. The problem is aggravated in lithium batteries which often operate at elevated temperatures, i.e. 60° C. and higher; the higher temperature tends to accelerate the swelling and dissolution processes.

There is, thus, still a need for a primer layer that improves adhesion of the electrode to the metal support surface and which is strongly resistant to organic solvents used in modern battery cells, particularly in lithium cells, while still providing good conductivity.

SUMMARY OF THE INVENTION

The present invention overcomes the aforementioned problem by providing a current collector which comprises a metal support coated with at least one primer layer. This primer layer comprises a polymeric material having pendant carboxylic acid groups crosslinked with a multifunctional crosslinking agent, and a conductive filler, and has the electrode layer adhered to the primer layer. The electrode layer may be a cathode or anode material.

The primer layer may be a single layer or may be a composite of two or more layers. When more than one layer is used, the second layer may comprise a non crosslinked polymeric material rendered conductive through the use of a conductive filler.

Ethylene acrylic acid copolymer, crosslinked using a multifunctional aziridinyl crosslinking agent, and carbon black as the conductive filler provides a good primer layer. Non crosslinked ethylene acrylic acid copolymer and carbon black may be used for a second layer applied over or under this primer. Polyurethane either alone or in combination with the ethylene acrylic acid polymer or copolymer may also used in the primer layers.

A complete battery is constructed using at least one current collector comprising a metal or metalized foil support coated with a primer which comprises a polymeric material having pendant carboxylic acid groups crosslinked with a multifunctional crosslinking agent, and a conductive filler, and contacted with an electrode i.e. an anode or cathode material applied thereto.

BRIEF DESCRIPTION OF THE DRAWINGS

The invention can be more fully understood from the following description thereof in connection with the accompanying drawings described as follows.

DESCRIPTION OF THE PREFERRED EMBODIMENT(S)

Figure 1:
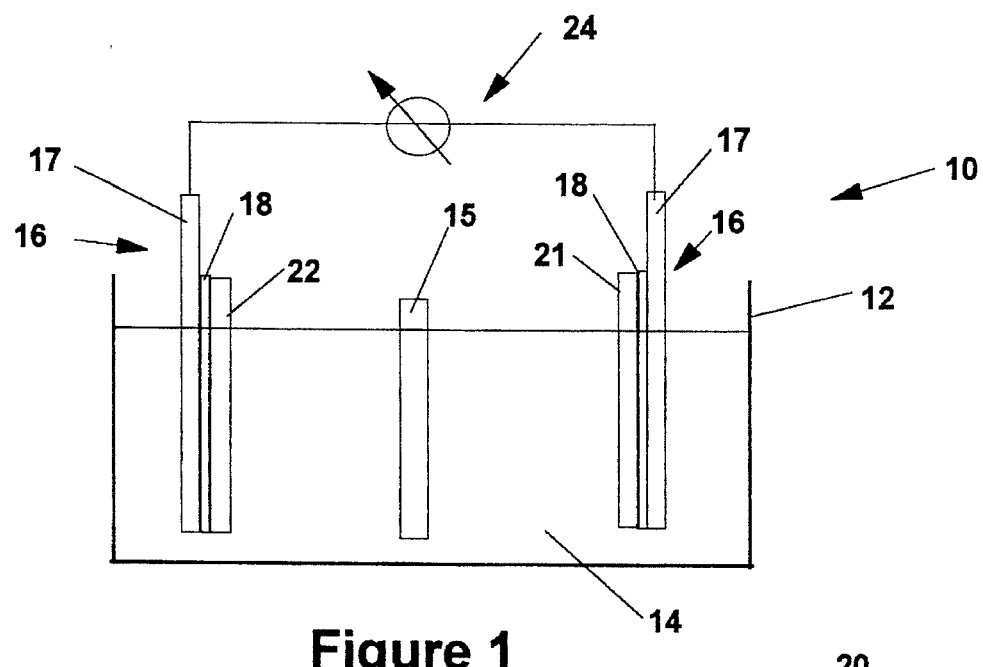
FIG. 1 is a schematic representation of a battery cell employing current collectors constructed in accordance with the present invention.

Throughout the following detailed description, similar reference characters refer to similar elements in all figures of the drawings.

Referring now to FIG. 1 there is shown in schematic representation the basic elements of a battery cell 10. This battery comprises a casing 12 which serves to contain an electrolyte 14. Two current collectors 16 are shown immersed in the electrolyte. As described in further detail below, the current collectors include a support 17, a primer layer 18 and an electrode layer. In a typical battery application, there will be an anode 21 electrode and a cathode 22 electrode present. The current collectors output an electric current to an outside circuit 24. An optional separator 15 may also be present.

FIG. 1 represents a basic battery structure useful in identifying the various components typically found in a battery for purposes of illustrating the present invention. U.S. Pat. Nos. 4,307,162, 4,125,686 and 4,210,708 disclose batteries, including lithium batteries, more representative of modern batteries wherein the current collector of the present invention may be advantageously employed.

Figure 2:
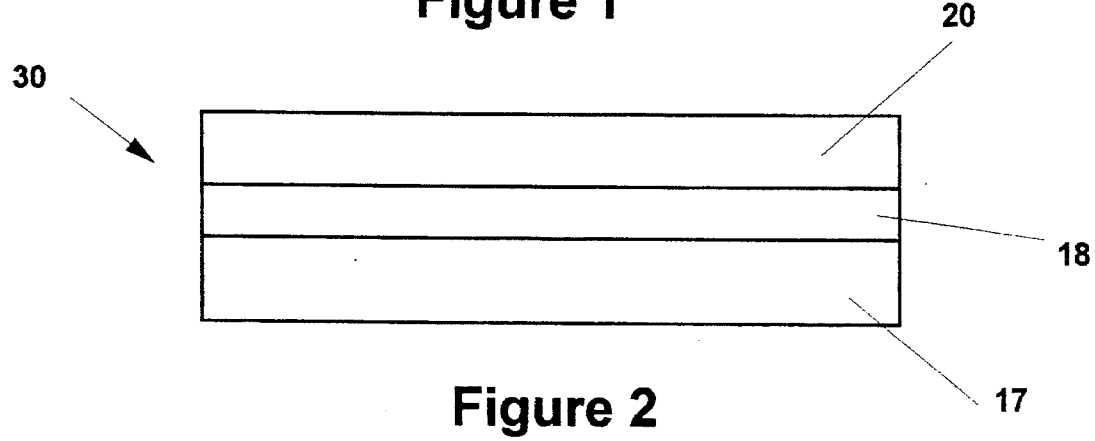
FIG. 2 is a schematic cross sectional representation of a current collector constructed in accordance with the present invention.

The current collector structure is best shown in FIG. 2. The current collector 30 includes a support 17 onto which is applied on at least one side a primer layer 18. Over the primer layer 18 there is applied another layer 20 which is an electrode, and which may be selected to be either a material serving as an anode, or a cathode. Application of the different layers may be done by casting the layer as a film and laminating the cast film onto the support or over a prior applied layer onto the support, or it may be cast directly onto the support or prior applied layer, or it may be coated onto the support or prior layer using any one of the known coating techniques, such as reverse roll coating, knife coating and the like.

Figure 3:
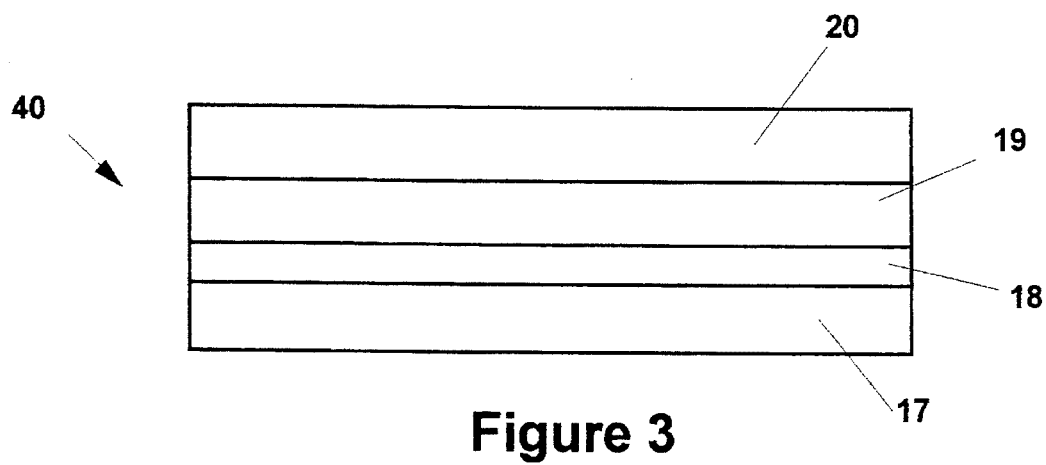
FIG. 3 is an alternate schematic cross sectional view of a current collector constructed in accordance with the present invention showing a primer coating having more than one layers.

An alternate current collector structure 40 is shown in FIG. 3 where there is an additional primer layer 19 interposed between the primer layer 18 and the electrode 20. Not illustrated is yet another current collector structure contemplated under this invention in which the additional primer layer 19 is applied under the primer layer 18 between the primer layer 18 and the support 17.

The support 17 is typically a metal, which may be a rigid flat piece, such as a metal sheet, or may be a metal foil. Metal foils are used in cases where it is desirable to fold or coil the current collector as is the case when making cylindrically shaped batteries. Metal foils or sheets particularly well suited for supports are aluminum, copper, nickel, silver, gold or stainless steel. The selection is usually dictated by the conductivity requirements, the electrochemical inertness, the physical properties such as mechanical strength, and the cost factors involved which tend to make certain materials such as leaf gold or silver commercially impractical due to high manufacturing costs.

The support 17 may also be a metalized plastic film or sheet such as metalized polyester, metalized polyimide, metalized polyolefin, metalized vinyl sheet, and the like. The plastic film or sheet may be rigid or flexible.

It is also contemplated by this invention that the primer layer 18 may be cast in sufficient thickness to form a self supporting film, in which case the support 17 may be reduced in thickness to a thin, non self supporting layer or a metalized film, applied on one side of the primer layer, the primer layer providing the necessary structural support. In an alternative structure, the self supporting conductive primer layer may serve as a single, combined conductive support and primer, without need for having a separate metal conductive layer applied thereto.

When the support 17 is a metalized plastic foil the primer layer 18 is applied on the metalized side of the metalized plastic foil.

The primer layer is comprised of a polymeric material having pendant carboxylic acid groups crosslinked with a multifunctional crosslinking agent and a conductive filler. Preferably, the polymeric material is an acrylic polymer or copolymer, such as a copolymer of ethylene and acrylic acid and the crosslinking agent a multifunctional aziridinyl cross linking agent. The combination of ethylene acrylic acid copolymer and aziridine crosslinking agent provides good chemical resistance to various electrolyte chemicals, including propylene carbonate and others found particularly in many types of lithium batteries. The chemical resistance results from the crosslinking of the pendant acid groups of the acrylic polymers or copolymers with the multifunctional aziridinyl crosslinking agent.

Other polymeric materials which may be used, include but are not limited to, polyacrylic acid; copolymers that contain acrylic acid moiety such as: poly(acrylic acid/ethyl acrylate) or poly(acrylic acid/butyl acrylate); and polymers that contain a substituted acrylic acid moiety such as a methacrylic acid moiety.

Crosslinking multifunctional agents which may be used include but are not limited to, are as follows: Neocryl® CX-100, manufactured by Zeneca Co., which is 1-Aziridinepropanoic acid, 2-methyl-,2-ethyl-2-[[3-(2-methyl-1-aziridinyl)-1-oxopropoxy] methyl]-1,3-propandiyl ester having a CAS No 64265-57-2; Xama-7® produced by Sancor Industries, which is Pentaerythriol-tris-[B-(aziridinyl)proprionate] having CAS No. 57116-45-7; Resimene® 717, which is methylated melamine; Resimene® 714 which is partially methylated melamine; Resimene® 882, which is butylated melamine and Resimene® 2060 which is methylated melamine-formaldehyde modified styrene allyl alcohol, all made by Monsanto Co.

Layer 18 may also comprise blends of polymeric materials having pendant carboxylic acid groups or blends of a polymeric material having pendant carboxyl acid groups, and, polyurethanes (preferably polyurethanes with acid numbers greater than 10), polyolefins, polyvinylidene fluoride, polytetrafluoroethylene and combinations thereof. It has also been found that in certain applications the polymeric material in layer 18 may be completely replaced by the polyurethane.

In addition to the crosslinked polymeric material, primer layer 18 includes a conductive filler which serves to render the layer conductive. Typically, such conductive fillers include carbon black, graphite fibers, graphite fibrils, metal coated glass particles, metal particles or metal fibers such as silver, copper nickel etc. or combinations thereof. Typically, the conductive particles will be limited in size to 0.01 μm to 10 μm.

A non conductive filler such as silica or titanium dioxide may be included in layer 18, together with the conductive filler to adjust its physical characteristics such as mechanical strength, surface roughness etc. or its conductivity.

The primer layer 18 is applied on the support typically to a dry thickness from 0.5 μm to 100 μm. The primer layer may be applied as a single layer or may be applied as a multiplicity of layers which may have the same chemical composition, or may have different chemical compositions.

The primer layer preferably comprises 5 to 70% by weight conductive filler and 30 to 95% by weight crosslinked polymer material composed of 50 to 100% by weight ethylene acrylic acid copolymer and from 0.1% to 50% by weight of a multifunctional crosslinking agent such as aziridine.

When an additional primer layer such as layer 19 is used, applied either over or under the primer layer 18, such layer comprises a non crosslinked polymeric material having pendant carboxylic acid groups, polyolefins, polyvinylidene fluoride, polytetrafluoroethylene, polyurethane and combinations thereof, and a conductive filler. A non conductive filler may also be added to enhance desirable physical or electrical properties of this additional layer 19, as is done for the primer layer 18.

The following examples are used to illustrate but not limit the invention.

EXAMPLE 1

The following materials were mixed in the following weight percent proportions, in a high shear mixer such as a ball mill to form a premix 1:

| | | |
|---|---|---|
| (1) | Water | 40.70 |
| (2) | Ethylene Acrylic Acid (containing 20% Acrylic acid whose molecular weight is 72) | 9.23 |
| (3) | Isopropanol | 27.00 |
| (4) | Dowanol ® PM[1] | 5.00 |
| (5) | Carbon Black | 11.27 |

[1]Dowanol ® PM is propylene glycol monomethyl ether, a product of the Dow Chemical Co.

The following materials were mixed in the following weight percent proportions, in a high shear mixer such as a ball mill to form a premix 2:

| | | |
|---|---|---|
| (1) | Water | 3.00 |
| (2) | Isopropanol | 1.00 |
| (3) | Xama 7 ®[2] | 2.80 |

[2]Xama-7 ® is a product of Sancor Industries, and is pentaerythriol-tris-[B-(aziridinyl)proprionate] having CAS No. 57116-45-7;

Premix 1 and premix 2 were next mixed together in a conventional mixer (hand paddle or impeller mixer is adequate) just before coating. An amount of 1% to 2% by weight dimethyl ethanol amine was added to the mixture to retard crosslinking until the coating has substantially dried. The mixture was then coated onto aluminum foil.

After the coating dried, a cathode electrode layer comprising Manganese dioxide, polyvinylidene fluoride and graphite was applied over the primer layer to form a current collector. This current collector exhibited good adhesion of the layers to each ether and good resistance to solvents typically found in electrolytes in batteries, such as N-methyl pyrollidinone, propylene carbonate, acetonitrile, and triethyl phosphate.

EXAMPLE 2

After coating a first primer layer of a mixture of premixes 1 and 2 prepared as in example 1 on an aluminum foil support, a second layer was coated over the first primer layer. This second primer layer was coated using only premix 1 to provide a non crosslinked layer over the crosslinked layer, resulting in the structure shown in FIG. 3. A cathode layer such as described in example 1 was applied over this non crosslinked layer to form a current collector that exhibited good chemical resistance to solvents typically found in battery electrolytes as shown in example 1.

The following examples are given to illustrate various primer layers prepared in accordance with the present invention which may be used to produce current collectors in accordance with the present invention by applying onto conductive supports and by applying onto the primer layer an anode or cathode electrode material. Electrode materials that are useful for use as anodes or cathodes depend on the nature of the application for which the current collector is intended. A number of references provided below, teach various cathodic and anodic materials that can be used with the primer layer of this invention to produce current collectors according to the present invention and batteries wherein such current collectors may be used. The disclosures in these references are intended to be illustrative rather than limiting of the materials for anodes and cathodes or of the batteries in which the current collector constructed in accordance with the present invention may be used.

REFERENCES (1) Safety of Carbon anodes for Lithium ion Cells, by Ulrich von Sacken, Eric Nodwell, Avtar Sundher and J. R. Dahn, Seventh International Meeting on Lithium Batteries, Boston, Mass. May 15–20, 1994.
(2) Novel Forms of Carbon as potential Anodes for Lithium Batteries, by Randal E. Winans and K. A. Carrado, Seventh international Meeting on Lithium Batteries, Boston, Mass. May 15–20, 1994.
(3) Lithium Ion Batteries for electronic applications By Sid Megahed, Seventh International Meeting on Lithium Batteries, Boston, Mass. May 15–20, 1994.
(4) Lithium Manganese Oxide Cathodes for rechargeable Lithium Batteries by Peter G. Bruce and Haitao Huang Seventh International Meeting on Lithium Batteries, Boston, Mass. May 15–20, 1994.
(5) Batteries (Primary cells), Kirk-Othmer, pages 515–521 Volume 3 Encyclopedia of Chemical Technology, 3rd Edition.

EXAMPLE 3

A primer layer for use in a current collector is prepared as in example 1 using the premixes disclosed therein; however, in this example, graphite is used instead of carbon black in an amount equal to the carbon black amount disclosed in example 1.

EXAMPLE 4

A primer layer for use in a current collector is prepared as in example 1 using the premixes disclosed therein; however, in this example, the amount of carbon black is reduced to 50% by weight of the amount disclosed in example 1 and graphite is substituted for the other 50% of the carbon black amount disclosed in example 1.

EXAMPLE 5

A primer layer for use in a current collector is prepared as in example 1 using the premixes disclosed therein; however, in this example, 9.3% by weight ethylene methacrylic acid is substituted for the 9.3% by weight ethylene acrylic acid used in example 1.

EXAMPLE 6

A primer layer for use in a current collector is prepared by mixing the following ingredients in a high shear mixer such as a ball mill mixer for about 30 minutes.

| | |
|---|---|
| Water | 40.06 parts by weight. |
| Ethylene Acrylic Acid | 1.45 |
| Isopropanol | 16.30 |
| 1-methyl-2-pyrrolidinone | 21.78 |
| Polyurethane, acid number 30 | 10.89 |
| Carbon Black | 9.52 |
| Xama ®7[2] Crossliking agent | 5.0 |

[2]Xama-7 ® is a product of Sancor Industries, and is pentaerythriol-tris-[B-(aziridinyl)proprionate] having CAS No. 57116-45-7;

After mixing, the resulting mixture is coated onto a sheet of paper having a silicone release layer thereon, and after drying, the paper is removed leaving behind a free standing self supporting layer. This layer is next laminated to an aluminum sheet to provide a layer whose resistance to 1-methyl-2-pyrrolidinone (NMP), propylene carbonate, acetonitrile, and triethyl phosphate solvents is good.

EXAMPLE 7

A primer layer is prepared as in example 6 by substituting 10 parts by weight of Resimene® 717[3] for the Xama® 7 Crosslinking agent.

[3]. Resimene® 717, is methylated melamine a product of Monsanto Corporation.

EXAMPLE 8

Using a high shear mix, such as a ball mill, the following ingredients were mixed to prepare a primer composition which was used to form a self supporting free standing primer layer.

| | |
|---|---|
| Water | 49.00 parts by weight. |
| 1-methyl-2-pyrrolidinone | 29.33 |
| Polyurethane, acid number 30 | 14.67 |
| Carbon Black | 7.00 |
| Xama ®7 aziridine crosslinking agent | 1.1 |

After mixing, the resulting mixture was coated onto a sheet of paper having a silicone release layer thereon, and after drying, the paper was removed resulting in a free standing self supporting layer which exhibits good resistance to the same solvents used in example 6.

EXAMPLE 9

A primer layer for use in a current collector is prepared as in example 8 by substituting 10 parts by weight of Resimene® 717 for the Xama® 7 Crosslinking agent.

EXAMPLE 10

Using a high shear mix, such as a ball mill, the following ingredients are mixed to prepare a primer composition which is used to form a self supporting free standing primer layer.

| | |
|---|---|
| Water | 176.4 parts by weight. |
| Ethyl acrylate/acrylic acid | 47.0 |
| Isopropanol | 113.4 |
| Dowanol ®PM[1] | 21.0 |
| Polyurethane, acid number 30 | 10.89 |
| Carbon Black | 37.8 |
| Xama ®7[2] Aziridine Crosslinking agent | 10.0 |

[1]Dowanol ® PM is propylene glycol monomethyl ether, a product of the Dow Chemical Co.
[2]Xama-7 ® is a product of Sancor Industries, and is pentaerythriol-tris-[B-(aziridinyl)proprionate] having CAS No. 57116-45-7;

After mixing, the resulting mixture is coated onto a sheet of paper having a silicone release layer thereon, and after drying, the paper is removed resulting in a free standing self supporting layer which exhibits good resistance to the solvents of example 6.

EXAMPLE 11

A primer layer is prepared as in example 10 by substituting 10 parts by weight of Resimene® 717 for the Xama® 7 Crosslinking agent.

EXAMPLE 12

A primer layer is prepared using a high shear mix, such as a ball mill, by mixing the following ingredients to prepare a primer which is then applied onto the metalized side of a metalized polyethylene terephthalate film.

| | |
|---|---|
| Water | 40.06 parts by weight. |
| Polyacrylic Acid | 1.45 |
| Isopropanol | 16.30 |
| 1-methyl-2-pyrrolidinone | 21.78 |
| Polyethylene emulsion[3] | 10.89 |
| Carbon Black | 9.52 |
| Xama ®7[2] Crossliking agent | 5.0 |

[2]Xama-7 ® is a product of Sancor Industries, and is pentaerythriol-tris-[B-(aziridinyl)proprionate] having CAS No. 57116-45-7;
[3]Luciwax 45, a product of Morton Chemicals

EXAMPLE 13

A primer layer is prepared as in example 12; however, an equal amount of polyvinylidene fluoride emulsion (Lumiflon 916 [Acid number 10] a modified PVDF, xylene, and carbon black in 26/48/26 parts percent by weight) is substituted for the polyethylene emulsion of example 12.

EXAMPLE 14

A lithium battery is constructed using current collectors employing a conductive primer layer in accordance with the present invention as described in more detail below. The anode is constructed using a copper foil over which is applied the conductive primer layer produced as in example 1; a carbonaceous layer of graphite in carboxy methyl cellulose at 2.2% by weight is next applied over the primer layer to complete the anode.

A copper or aluminum foil onto which there is again applied a layer of a conductive primer prepared in accordance with example 1, is used to make a cathode. The cathode is fabricated by dry mixing 80% by weight lithium manganese oxide ($LiMn_2O_4$ spinel structure), 6.7% by weight PTFE binder and 13.3% by weight carbon black, prepared as taught in reference 4 above.

The two current collectors thus produced are contacted with an electrolyte material consisting of a 1M solution of $LiAsF_6$ dissolved in propylene carbonate also as taught in the same reference 4 to produce a rechargeable lithium battery cell.

The description of the current collector herein above was done in conjunction with its use in a battery application. In addition to the battery applications described above, the current collector of this invention, may, with appropriate selection of electrode applied to the primer, function in other applications, particularly in medical applications which use electrodes, and such use is also within the scope of this invention.

Those skilled in the art having the benefit of the teachings of the present invention as hereinabove set forth, can effect numerous modifications thereto. These modifications are to be construed as being encompassed within the scope of the present invention as set forth in the appended claims.

I claim:

1. A current collector comprising:
   a conductive support,
   a conductive primer layer applied thereon, said conductive primer layer comprising a crosslinked polymeric material which is the result of a polymeric material having pendant carboxylic acid groups crosslinked with a multifunctional crosslinking agent; and a conductive filler; and
   an electrode layer adhered to said primer layer.

2. The current collector according to claim 1 wherein the polymeric material having pendant carboxylic acid groups is an acrylic polymer or copolymer.

3. The current collector according to claim 2 wherein the acrylic copolymer is an ethylene/acrylic copolymer.

4. The current collector according to claim 3 wherein the multifunctional crosslinking agent is a multifunctional aziridinyl crosslinking agent and the conductive filler is carbon black.

5. The current collector according to claim 1 wherein the multifunctional crosslinking agent is a multifunctional aziridinyl crosslinking agent.

6. The current collector according to claim 1 further comprising an additional layer applied over said primer layer and under said electrode layer, the additional layer consisting essentially of a non crosslinked polymeric material having pendant carboxylic acid groups and a conductive filler.

7. The current collector according to claim 6 wherein the second polymeric material is a polymer or copolymer of acrylic acid.

8. The current collector in accordance with claim 1 wherein the conductive filler is selected from the group consisting of:
   carbon black, graphite, graphite fibers, graphite fibrils, metal coated particles, metal particles and combinations thereof.

9. The current collector according to claim 1 further comprising an additional layer applied under said primer layer and over said conductive support, the additional layer consisting essentially of a non crosslinked polymeric material having pendant carboxylic acid groups and a conductive filler.

10. The current collector in accordance with claim 1 wherein the conductive support is a metal.

11. The current collector in accordance with claim 1 wherein the conductive support is a conductive foil.

12. The current collector in accordance with claim 1 wherein the conductive support is a conductive plastic film.

13. The current collector in accordance with claim 12 wherein the conductive plastic film has been rendered conductive by the application of the primer layer thereon.

14. The current collector in accordance with claim 12 wherein the conductive plastic film is a self supporting primer layer.

15. The current collector in accordance with claim 12 wherein the conductive film is a metalized plastic film.

16. A current collector in accordance with claim 1 wherein the primer layer is a self supporting layer.

17. A current collector in accordance with claim 1 wherein the primer layer also includes a non conductive filler.

18. The current collector according to claim 1 wherein the polymeric material having pendant carboxylic acid groups is a polyurethane.

19. A current collector comprising:
    a conductive support,
    a conductive primer layer applied thereon, said conductive primer layer comprising a conductive filler; a crosslinked polymeric material which is the result of a polymeric material having pendant carboxylic acid groups crosslinked with a multifunctional crosslinking agent; and a resin selected from the group consisting of polyolefins, polyvinylidene fluoride, polytetrafluoroethylene, a polyurethane, and combinations thereof; and
    an electrode layer adhered to said primer layer.

20. The current collector according to claim 19 wherein the multifunctional crosslinking agent is a multifunctional aziridinyl crosslinking agent.

21. The current collector in accordance with claim 19 wherein the conductive filler is selected from the group consisting of:
    carbon black, graphite, graphite fibers, graphite fibrils, metal coated particles, metal particles and combinations thereof.

22. The current collector according to claim 19 further comprising an additional layer applied over said primer layer and under said electrode layer, the additional layer consisting essentially of a non crosslinked polymeric material having pendant carboxylic acid groups, polyolefins, polyvinylidene fluoride, polytetrafluoroethylene, a polyurethane and combinations thereof, and a conductive filler.

23. The current collector according to claim 19 further comprising an additional layer applied under said primer layer and over said conductive support, the additional layer consisting essentially of a non crosslinked polymeric material having pendant carboxylic acid groups, polyolefins, polyvinylidene fluoride, polytetrafluoroethylene, a polyurethane, and a conductive filler.

24. The current collector in accordance with claim 19 wherein the conductive support is a metal.

25. The current collector in accordance with claim 19 wherein the conductive support is a conductive foil.

26. The current collector in accordance with claim 19 wherein the conductive foils is a metalized plastic film.

27. A current collector in accordance with claim 19 wherein the primer layer is a self supporting layer.

28. A current collector in accordance with claim 19 wherein the primer layer also includes a non conductive filler.

29. The current collector according to claim 19 wherein the polymeric material having pendant carboxylic acid groups is an acrylic polymer having pendant carboxylic acid groups, or an acrylic copolymer having pendant carboxylic acid groups.

30. The current collector according to claim 29 wherein the acrylic copolymer is an ethylene/acrylic acid copolymer.

31. A battery comprising
    a casing,
    an electrolyte within said casing,
    an anode and a cathode electrode in contact with said electrolyte wherein at least one current collector in said casing comprises
    a conductive support,
    a conductive primer layer applied thereon, said conductive primer layer comprising a conductive filler; a crosslinked polymeric material which is the result of a polymeric material having pendant carboxylic acid groups crosslinked with a multifunctional crosslinking agent; and a resin selected from the group consisting of polyolefins, polyvinylidene fluoride, polytetrafluoroethylene, a polyurethane, and combinations thereof; and
    wherein said anode or cathode electrode is adhered to said primer layer.

32. The battery in accordance with claim 31 wherein the casing is also the conductive support.

* * * * *